(12) United States Patent
Bocking et al.

(10) Patent No.: US 8,495,059 B2
(45) Date of Patent: *Jul. 23, 2013

(54) METHOD OF SEARCHING FOR PERSONAL INFORMATION MANAGEMENT (PIM) INFORMATION AND HANDHELD ELECTRONIC DEVICE EMPLOYING THE SAME

(75) Inventors: Andrew Douglas Bocking, Conestogo (CA); Michael Thomas Hardy, Waterloo (CA); Robert John Thomas Bredin, Guelph (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/531,865

(22) Filed: Jun. 25, 2012

(65) Prior Publication Data

US 2012/0265753 A1    Oct. 18, 2012

Related U.S. Application Data

(63) Continuation of application No. 10/931,054, filed on Aug. 31, 2004, now Pat. No. 8,239,375.

(51) Int. Cl.
*G06F 7/00* (2006.01)
*G06F 17/30* (2006.01)

(52) U.S. Cl.
USPC .......... 707/722; 707/728; 707/731; 707/732; 707/758

(58) Field of Classification Search
USPC ............... 707/705, 706, 723, 728, 731, 732, 707/758, 999.3, 722
See application file for complete search history.

(56) References Cited

U.S. PATENT DOCUMENTS

| | | | |
|---|---|---|---|
| 5,764,818 | A | 6/1998 | Capps et al. |
| 6,049,796 | A | 4/2000 | Siitonen et al. |
| 6,405,060 | B1 | 6/2002 | Schroeder et al. |
| 6,452,588 | B2 | 9/2002 | Griffin et al. |
| 6,489,950 | B1 | 12/2002 | Griffin et al. |
| 6,499,051 | B1 | 12/2002 | Kanemitsu |
| 6,751,612 | B1 | 6/2004 | Schuetze et al. |
| 7,730,012 | B2 | 6/2010 | Arrouye et al. |

(Continued)

FOREIGN PATENT DOCUMENTS

WO    01/33430 A1    5/2001

OTHER PUBLICATIONS

Blevins, M., "Find Ignore Hack v1.4", available online: http://www.freewarepalm.com/utilities/findignorehack.shtml, 2000, 2 pages.

(Continued)

*Primary Examiner* — Hares Jami
(74) *Attorney, Agent, or Firm* — Ridout & Maybee LLP

(57) ABSTRACT

A method of searching for Personal Information Management information of a handheld electronic device includes accepting input of one or more search criteria, such as text search criteria and/or name search criteria; accepting input of a representation of a plurality of different databases or applications of the handheld electronic device including Personal Information Management information to be searched; and conducting a search of the different databases or applications based upon the one or more search criteria and the representation of different databases or applications. The method determines one or more search results from the search and displays those search results.

20 Claims, 12 Drawing Sheets

U.S. PATENT DOCUMENTS

| | | | |
|---|---|---|---|
| 8,239,375 B2 * | 8/2012 | Bocking et al. | 707/722 |
| 2003/0004922 A1 | 1/2003 | Schmidt et al. | |
| 2003/0154373 A1 | 8/2003 | Shimada et al. | |
| 2004/0117348 A1 | 6/2004 | Miyakawa et al. | |
| 2005/0080770 A1 | 4/2005 | Lueder et al. | |
| 2005/0132296 A1 | 6/2005 | Milic-Frayling et al. | |
| 2005/0235319 A1 | 10/2005 | Carpenter et al. | |
| 2005/0246365 A1 | 11/2005 | Lowles et al. | |
| 2006/0015818 A1 | 1/2006 | Chaudhri et al. | |

OTHER PUBLICATIONS

Microsoft Corporation, "Windows Mobile™ software for Pocket PC-Support", available online: http://www.microsoft.com/windowsmobile/help/pocketpc/toc/programs.aspx?region=americas& language=en&os=2003SE&keyname=&devicename=Dell%20Axim%20X5&deviceid=37&mobop=&deviceregion=americas&cdma=&gsm=, 2004, 1 page.

Microsoft Corporation, "Windows Mobile™ software for Pocket PC-Support", available online: http://www.microsoft.com/windowsmobile/help/pocketpc/toc/programs.aspx?region=americas& language=en&os=2003SE&keyname=&devicename=Mio%20168%20GPS%20Pocket%20PC&deviceid=96&mobop=&deviceregion=americas&cdma=&gsm=, 2004, 1 page.

Marcus Brooks, "Introducing the Dvorak Keyboard", available online: http://www.mwbrooks.com/dvorak/, Jul. 8, 2000, 3 pages.

palmONE, Inc., "User Guide for the Zire™ 31 Handheld—Finding Information", available online: http://www.palmone.com/us/support/userguides/zire31/us/appsd.html, 2004, 1 page.

palmONE, Inc., "User Guide for the Zire™ 72 Handheld—Finding Information", available online: http://www.palmone.com/us/support/userguides/zire72/ecc/appsd.html#wp1270606, 2004, 1 page.

palmONE, Inc., "User Guide for the Zire™ 31 Handheld—Accessing a web page", available online: http://www.palmone.com/us/support/userguides/zire72/ecc/webproa.html#wp1067488, 2004, 3 pages.

* cited by examiner

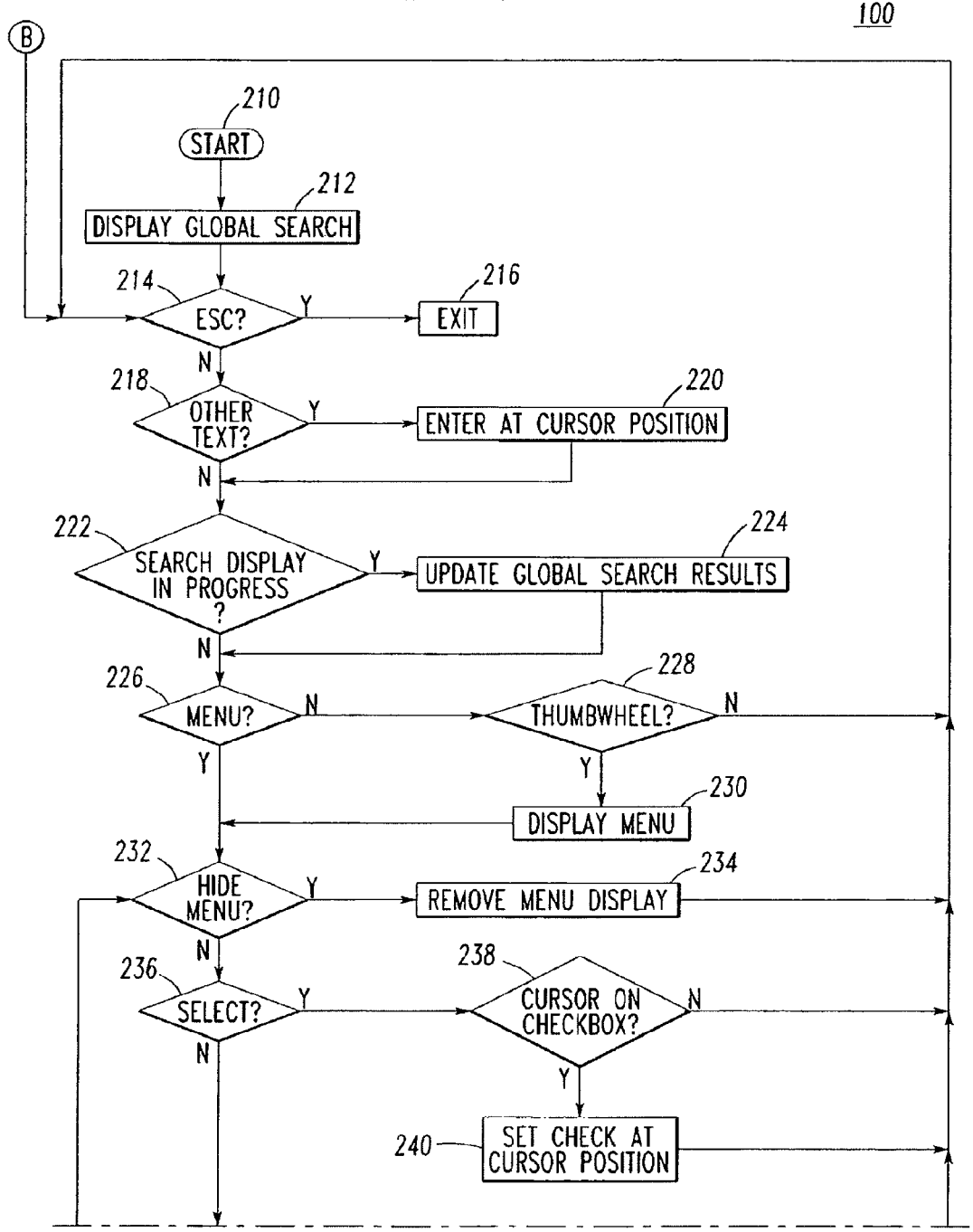
FIG.10A1

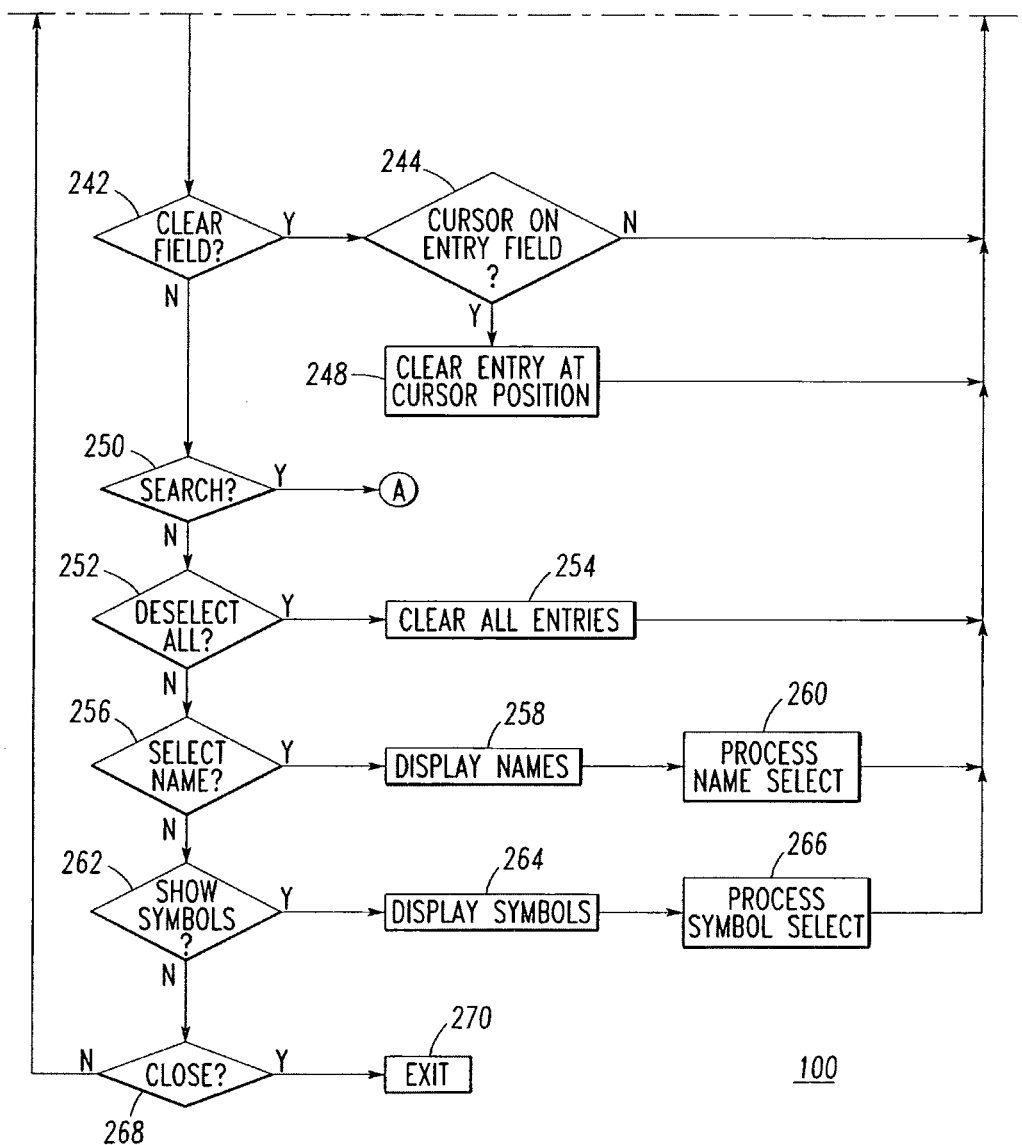
FIG.10A2

METHOD OF SEARCHING FOR PERSONAL INFORMATION MANAGEMENT (PIM) INFORMATION AND HANDHELD ELECTRONIC DEVICE EMPLOYING THE SAME

This is a continuation of U.S. patent application Ser. No. 10/931,054 filed on Aug. 31, 2004 entitled "METHOD OF SEARCHING FOR PERSONAL INFORMATION MANAGEMENT (PIM) INFORMATION AND HANDHELD ELECTRONIC DEVICE EMPLOYING THE SAME" which is incorporated herein by reference.

BACKGROUND OF THE INVENTION

1. Field of the Invention

The invention relates generally to handheld electronic devices and, more particularly, to a handheld electronic device including a search function. The invention also relates to a method of searching for data on a handheld electronic device.

2. Background Information

Numerous types of handheld electronic devices are known. Examples of such handheld electronic devices include, for instance, personal digital assistants (PDAs), handheld computers, two-way pagers, cellular telephones, and the like. Many handheld electronic devices also feature wireless communication capability, although many such handheld electronic devices are stand-alone devices that are functional without communication with other devices.

For example, known wireless handheld electronic devices support searching items that appear in a message list. Known PDA-centric devices (e.g., Palm®; various Pocket PCs) offer various searching functions. For example, known software for various Pocket PCs allows a user to find a file or an item of a single database through the following sequence of steps: (1) tap Start>Find; (2) in Find, enter the file name, word or other information the user wants to search for, except if the user has looked for this item before, tap the Find arrow and select the item from the list; (3) in Type, select a data type to help narrow the search; (4) tap Go after which the My Documents folder and subfolders are searched; and (5) in a Results list, tap the item the user wants to open.

As another example, a Palm® handheld device permits a user to employ a "Find" function to locate any word or phrase on the handheld. The user taps "Find", enters the text to be found and then selects OK, and then taps the text that the user wants to review. The user, however, has no control over the scope of the search or the manner in which the word or phrase is applied to the search. Also, it is believed that a user cannot manipulate items on the search results screen and, instead, must open the item (e.g., a message) before, for example, replying or forwarding the same.

Searching items that appear in a single message list or single database or single application is, however, a significant limitation due to the fact that there is a potentially a relatively large amount of data that is not displayed in the message list including, for example, addresses, calendar appointments, memos, tasks and other personal information management (PIM) data. The fact that this data is not searchable in an efficient manner represents an inconvenience to users. There remains a need, therefore, for a wireless handheld electronic device to be able to provide an efficient global search of that device.

There is also a need for a wireless handheld electronic device to be able to find specific message and other PIM data by using a text search string and a person's name.

Accordingly, there is room for improvement in handheld electronic devices including a search function, and in methods of searching for data on handheld electronic devices.

SUMMARY OF THE INVENTION

These needs described above are met by the invention, which provides an advanced and efficient interface on, for example, a converged wireless handheld electronic device to search message and other PIM data based upon one or more search criteria for selected plural components of the handheld electronic device. By accepting input of the search criteria and the components to be searched, the speed of the search is optimized.

In accordance with one aspect of the invention, a method of searching for Personal Information Management information of a handheld electronic device comprises: accepting input of at least one search criteria; accepting input of a representation of a plurality of components of the handheld electronic device including Personal Information Management information to be searched; conducting a search of the components based upon the at least one search criteria and the representation of a plurality of components; determining at least one search result from the search; and displaying the at least one search result.

The method may accept input to directly manipulate the at least one search result.

The method may employ as the at least one search criteria a text search criteria and a name search criteria; employ as the plurality of components at least a first component including a number of first items having a number of text fields and a number of name fields, and a second component including a number of second items having a number of text fields and a number of name fields; match the text search criteria against the text fields of the first and second items; and match the name search criteria against the name fields of the first and second items.

The method may display as the at least one search result a plurality of search results; employ as the representation of a plurality of components a representation of at least a first one of the components and a second one of the components; display a first group of the search results associated with the first one of the components; and separately display a second group of the search results associated with the second one of the components.

The method may employ as the components a plurality of different applications; employ as the at least one search result a plurality of search results; display the search results on a search results screen; for each of the different applications, interact with each of the search results from a corresponding one of the different applications in a corresponding manner; and for each of the search results of the search results screen, interact with a corresponding one of the search results in the same corresponding manner as the corresponding manner of the corresponding one of the different applications.

The method may display an icon associated with an application program on a home screen; accept input to launch the application program from the icon; display a menu including a search menu item from the launched application program; and accept input to launch the search from the menu item.

As another aspect of the invention, a handheld electronic device comprises: a housing; a processor circuit including a plurality of routines and a memory having a plurality of components with Personal Information Management information; an input circuit cooperating with the processor circuit; and a display circuit cooperating with the processor circuit, wherein at least one of the routines is adapted to input from the input circuit at least one search criteria for the Personal Information Management information and a representation of at least some of the components to be searched in the memory, to conduct a search of the memory based upon the at least one search criteria and the representation of at least some of the components to be searched, to determine at least one search result from the search, and to display at the display circuit the at least one search result.

The plurality of components to be searched may include a plurality of application databases in the memory including at least some of a messages application database, a calendar application database, an address book application database, a memos application database and a tasks application database.

As another aspect of the invention, a method of searching for information of a handheld electronic device comprises: accepting input of at least one search criteria; accepting input of a representation of a plurality of components of the handheld electronic device including information to be searched; conducting a search of the components based upon the at least one search criteria and the representation of a plurality of components; determining at least one search result from the search; and displaying the at least one search result.

The method may display as the at least one search result a plurality of search results; employ as the representation of a plurality of components a representation of at least a first one of the components and a second one of the components; display a first group of the search results including at least a first count of matches associated with the first one of the components; separately display a second group of the search results including at least a second count of matches associated with the second one of the components; and accept input to expand one of the first and second groups to display individual items of the one of the first and second groups. The method may accept input to directly manipulate one of the individual items of the one of the first and second groups.

BRIEF DESCRIPTION OF THE DRAWINGS

A full understanding of the invention can be gained from the following description of the preferred embodiments when read in conjunction with the accompanying drawings in which:

FIGS. 10A1-10A2 and 10B-10D form a flowchart of software executed by the processor of FIG. 2.

DESCRIPTION OF THE PREFERRED EMBODIMENTS

As employed herein, the term "Personal Information Management" or "PIM" shall expressly include, but not be limited by, messages, calendar information, address book or contact information, memos, tasks information, files, notes, links, expenses information and other PIM information.

As employed herein, the term "information" shall expressly include, but not be limited by, PIM data and other PIM information.

As employed herein, the term "components" means separate and distinct databases or applications of a handheld electronic device each component of which includes corresponding information.

As employed herein, the expression "a number of" and variations thereof shall refer broadly to any quantity or count of one or more.

The invention is described in association with a wireless handheld electronic device, although the invention is applicable to a wide range of handheld electronic devices.

Figure 1:
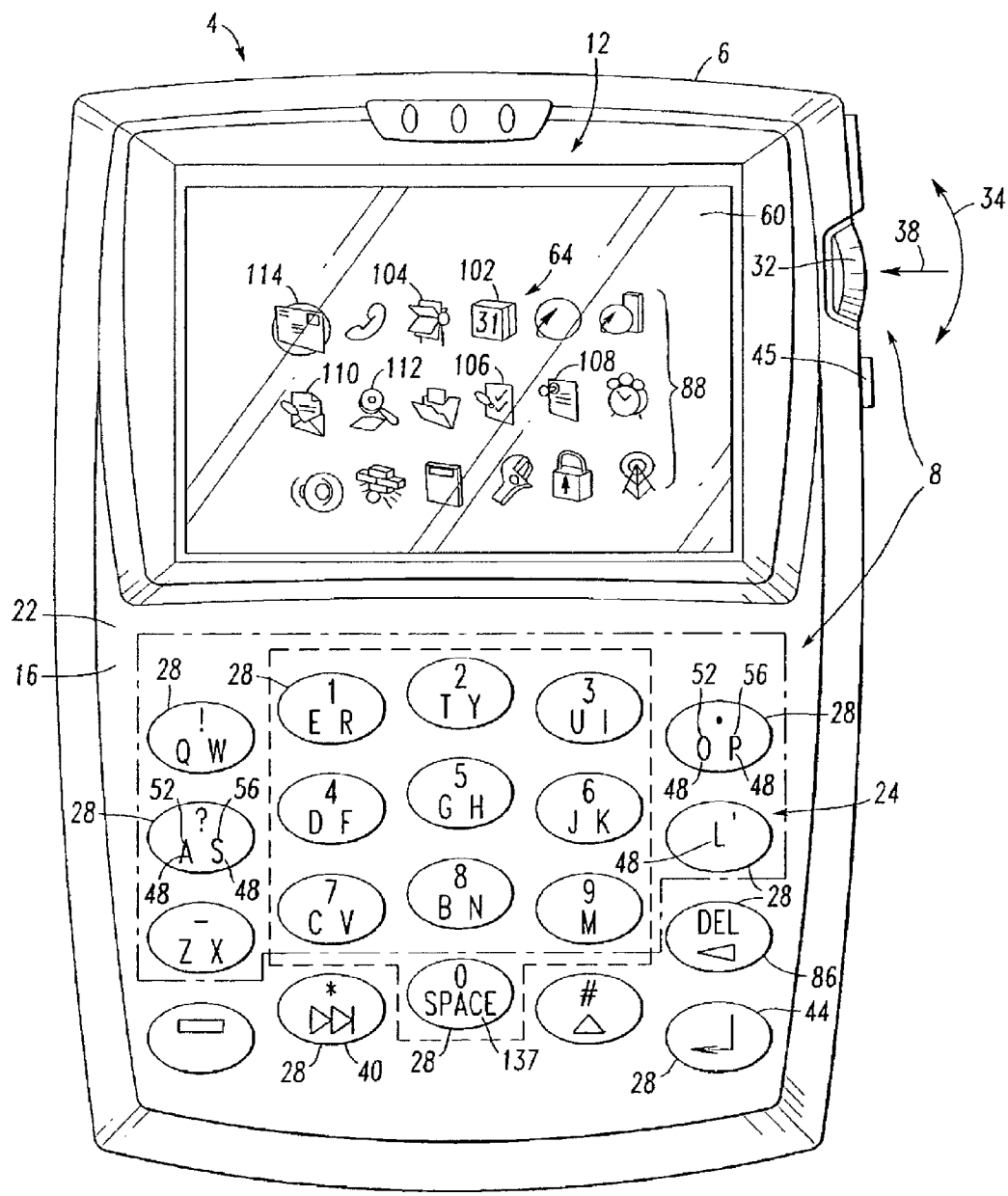
FIG. 1 is a top plan view of a handheld electronic device in accordance with the invention.
Figure 2:
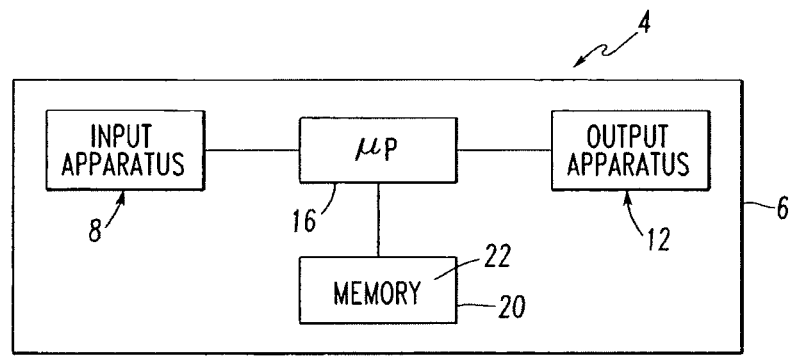
FIG. 2 is a schematic depiction of the handheld electronic device of FIG. 1.
Figure 3:
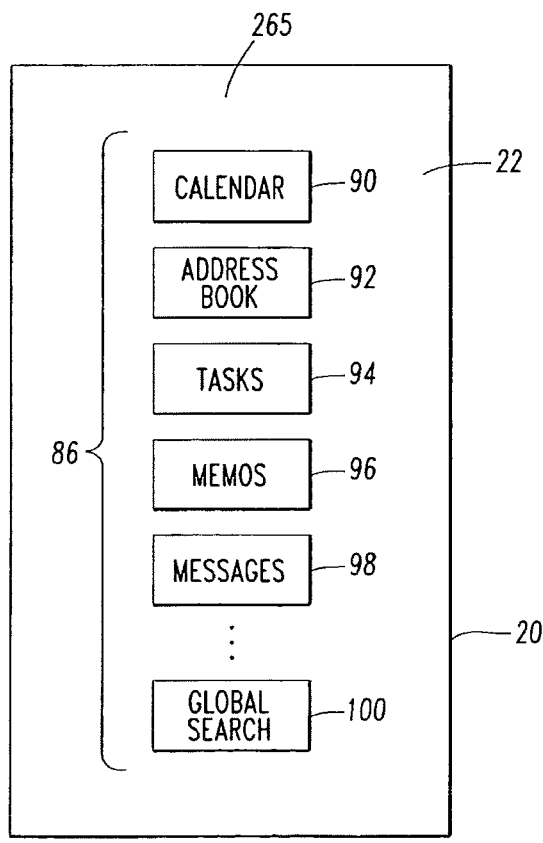
FIG. 3 is a schematic depiction of a portion of the memory of the handheld electronic device of FIG. 2.

A handheld electronic device 4 is indicated generally in FIG. 1 and is depicted schematically in FIG. 2. The example handheld electronic device 4 includes a housing 6 upon which are disposed a processor unit that includes an input apparatus 8, an output apparatus 12, a processor 16 (as shown in FIG. 2), a memory 20 (FIG. 2), and a plurality of routines 22 (FIGS. 2 and 3). The processor 16 may be, for instance, and without limitation, a microprocessor (µP) that responds to inputs from the input apparatus 8 and provides output signals to the output apparatus 12. The processor 16 also interfaces with the memory 20. Examples of handheld electronic devices are included in U.S. Pat. Nos. 6,452,588 and 6,489,950, which are incorporated by reference herein.

Example 1

As can be understood from FIG. 1, the input apparatus 8 includes a keypad 24 and a thumbwheel 32. The keypad 24 is in the example form of a reduced QWERTY keyboard including a plurality of keys 28 that serve as input members. The wireless handheld electronic device 4, as shown, employs a user interface including, for example, the QWERTY keyboard and the thumbwheel 32 for user interface navigation. Rather than burden the user, the relatively difficult choices are preferably made by the wireless handheld electronic device 4.

The expression "reduced" and variations thereof, in the context of a keyboard, a keypad, or other arrangement of input members, shall refer broadly to an arrangement in which at least one of the input members has assigned thereto a plurality of characters within a given set, such as a plurality of letters, for example, in the set of Roman letters, for example, thereby potentially rendering ambiguous an intended result of an actuation of the at least one of the input members. As a result, one of the routines 22 (FIG. 2) is dedicated to a disambiguation function.

Example 2

It is noted, however, that the keypad 24 may be of other configurations, such as an AZERTY keyboard, a QWERTZ keyboard, a Dvorak keyboard, or other keyboard or keypad arrangement, whether presently known or unknown, and either reduced or not reduced (i.e., full).

Example 3

As an alternative to the thumbwheel 32, a wide range of cursor positioning and/or function selecting mechanisms or other suitable user input devices (e.g., a touch pad; a joystick button), whether presently known or unknown, may be employed.

Continuing to refer to FIG. 1, the keys 28 are disposed on a front face of the housing 6, and the thumbwheel 32 is disposed at a side of the housing 6. The thumbwheel 32 can serve as another input member and is both rotatable, as is indicated by the arrow 34, to provide selection inputs to the processor 16, and also can be pressed in a direction generally toward the housing 6, as is indicated by the arrow 38, to provide another selection input to the processor 16.

Among the keys 28 of the keypad 24 are a <NEXT> key 40 and an <ENTER> key 44. The <NEXT> key 40, wherein, for example, "<NEXT>" may be a symbol or may be the word "next" provided (e.g., printed) on the key, can be pressed to provide a selection input to the processor 16 and provides substantially the same selection input as is provided by a rotational input of the thumbwheel 32. Since the <NEXT> key 40 is provided adjacent a number of the other keys 28 of the keypad 24, the user can provide a selection input to the processor 16 substantially without moving the user's hands away from the keypad 24 during a text entry operation. Another key, the <ESC> key 45 is disposed on the side of the housing 6 adjacent the thumbwheel 32, although the same or similar key may be disposed as part of the keypad 24.

As can further be seen in FIG. 1, many of the keys 28 include a number of characters 48 disposed thereon. In the example depiction of the keypad 24, many of the keys 28 include two characters, such as including a first character 52 and a second character 56 assigned thereto. It is understood that the expression "characters" shall broadly be construed to include letters, digits, symbols and the like and can additionally include ideographic characters, components thereof, and the like.

One of the keys 28 of the keypad 24 includes as the characters 48 thereof the letters "Q" and "W", and an adjacent key 28 includes as the characters 48 thereof the letters "E" and "R". It can be seen that the arrangement of the characters 48 on the keys 28 of the keypad 24 is generally of a QWERTY arrangement, albeit with many of the keys 28 including two of the characters 48.

Among the keys 28 of the keypad 24 additionally is a <DEL> key 86 that can be provided to delete a text entry.

The memory 20 is depicted schematically in FIG. 3. The memory 20 can be any of a variety of types of internal and/or external storage media such as, without limitation, RAM, ROM, EPROM(s), EEPROM(s) and/or the like that provide a storage register for data storage such as in the fashion of an internal storage area of a computer, and can be volatile memory or nonvolatile memory. The memory 20 additionally includes the routines 22 for the processing of data. The routines 22 can be in any of a variety of forms such as, without limitation, software, firmware, and the like.

Referring again to FIG. 1, the output apparatus 12 includes a display 60 upon which is provided an example output 64. The display 60 may also include a caret (e.g., cursor) 84 (FIGS. 4 and 5) that depicts generally where the next input from the input apparatus 8 will be received. The output 64 of FIG. 1 is depicted as displaying a home screen that represents a number of applications 86 (FIG. 3 shows some of the example possible applications 86) depicted as corresponding discrete icons 88. The applications 86 include, for example, a Calendar application 90, an Address Book application 92, a Tasks application 94, a MemoPad (Memos) application 96, a Messages application 98 and a Global Search application 100. The corresponding icons 88 include, for example, the Calendar icon 102, the Address Book icon 104, the Tasks icon 106, the MemoPad icon 108, the Messages icon 110 and the Global Search icon 112, respectively.

In FIG. 1, the home screen output 64 is currently active and would constitute another one of the applications 86 of FIG. 3. One of the other applications 86, such as the Messages application 98, can be initiated from the home screen output 64 by providing a suitable input through the input apparatus 16, such as by suitably rotating the thumbwheel 32 and providing a selection input by translating the thumbwheel 32 in the direction indicated by the arrow 38. For example, the home screen output 64 displays the icon 112 associated with the Global Search application 100, and accepts input from the input apparatus 16 to launch a global search, as will be described below, from that icon.

Although not expressly shown in FIG. 1, the icons 88 may be part of a ribbon (not shown) including a series of icons that form a device toolbar (not shown) or taskbar (not shown) on the home screen output 64.

Although not shown, a separate and relatively more granular "search messages" application (not shown) may be provided through the e-mail icon 114 and a corresponding e-mail application (not shown).

The Global Search application 100 of FIG. 3 allows the user to search, for example, for messages, address book contacts, calendar appointments, tasks or memos that match a set of search criteria. The search criteria that can be specified include text and/or a name. Items that match these search criteria are displayed and are grouped by type (e.g., all calendar appointments are together; all messages are together). The user is able to interact with the items in the search results as they would within the respective applications 90, 92, 94, 96, 98 (FIG. 3). For example, if a contact is displayed in the search results for the Address Book application 92, then the user is able to, for example, display (e.g., view), edit, delete, e-mail or take any other address book function with the contact.

Figure 4:
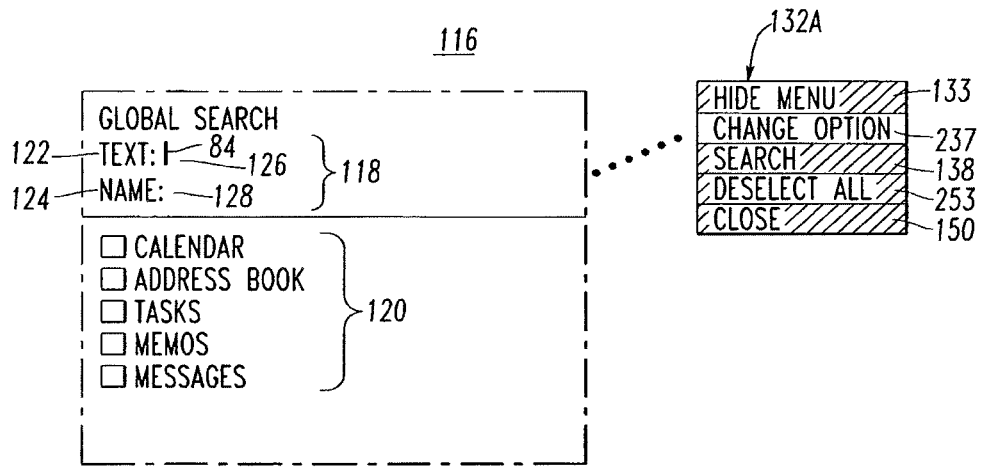
FIG. 4 is an example of a global search specification screen in accordance with an embodiment of the invention.
Figure 5:
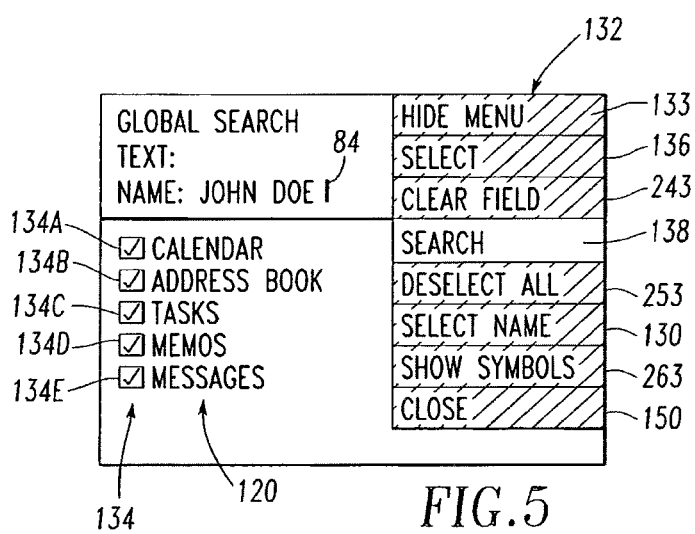
FIG. 5 is an example of sample entries for the global search specification screen of FIG. 4 along with an associated pull-down menu.

FIG. 4 shows an example of a global search specification screen 116 that is displayed after the Global Search application 100 of FIG. 3 is launched. Here, the user may specify the search criteria 118 and the components 120 to be searched. The user can choose to enter text 122 and/or a name 124 (e.g., John Doe (FIG. 5); John; Mary; Smith; John Smith) for the search criteria 118. Text that is entered into the "Text:" field 126 will match against text-related fields in PIM items (e.g., Table 2, below) and text entered into the "Name:" field 128 will match against name-related fields in those PIM items. If the user's focus is in the Name field 128, then the user can alternatively use the Select Name menu item 130 of FIG. 5 to select a name from the device's Address Book application 92 (FIG. 3). For example, the pull-down menu 132 (FIG. 5) can be initiated from within the Global Search application 100 by providing an input through the input apparatus 16, such as by providing a selection input by translating the thumbwheel 32 in the direction indicated by the arrow 38 (FIG. 1).

FIG. 5 is an example of sample entries for the global search specification screen 116 of FIG. 4 along with the associated pull-down menu 132. As shown in FIG. 5, the user specifies which of the components 120 to search through the example check boxes 134. Although check boxes are shown, any suitable input selection mechanism may be employed. In this example, the global search application 100 (FIG. 3) searches the Calendar application 90, Address Book application 92, Tasks application 94, MemoPad (Memos) application 96 and Messages application 98, since all of the check boxes 134 are selected. It will be appreciated that the user may check the check box 134 next to zero, one, some or all of the corresponding components 120. The menu item "Select" 136 or the keyboard key <SPACE> 137 (FIG. 1) can be used for this purpose. If none of the components 120 are selected, then no search is performed. Similarly, if none of the search criteria 118 (FIG. 4) are entered, then no search is performed. However, if one, some or all of the components 120 are selected, and if one, some or all of the search criteria 118 (only two criteria 118 are shown in FIG. 4) are entered, then the search is started responsive to the user selecting the menu item "Search" 138.

Figure 6:
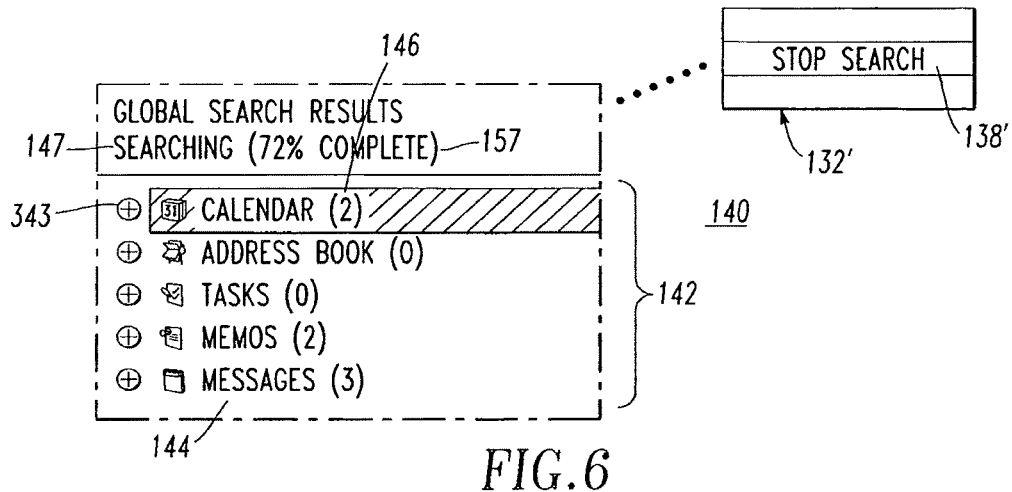
FIG. 6 is an example of a interim global search results screen in accordance with another embodiment of the invention.

After this is done, the interim global search results screen 140 of FIG. 6 is displayed. This example screen 140, which, of course, depends, for example, on the components 120 selected for the search in FIG. 5, is displayed after initiating the search of the selected components 120 and before concluding that search. The screen 140 displays one or more of the search results 142, which are grouped by type corresponding to the selected components 120 of FIGS. 4 and 5. In other words, for example, all messages 144 are grouped together and all calendar appointments 146 are grouped together. Also, this screen 142 is successively updated as the search continues with an in progress (e.g., "Searching" 147) status.

Figure 7:
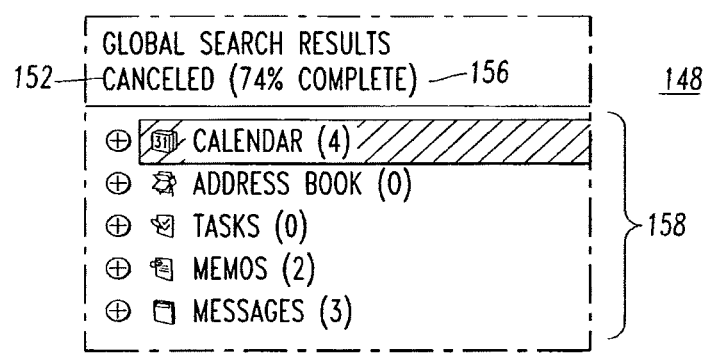
FIG. 7 is an example of a canceled global search results screen in accordance with another embodiment of the invention.

FIG. 7 shows an example of a canceled global search results screen 148. An in-progress search (as shown by FIGS. 6 and 7) can be canceled by using the menu 132' (FIG. 6) and selecting the menu item "Stop Search" 138' or by pressing the <ESC> key 45 (FIG. 1). The menu 132' may be similar to the menu 132 of FIG. 5 except that the menu item 138' is displayed when a search is in progress. If a search is canceled, then the status line will indicate this ("Canceled" 152) and the percentage complete 156 when the search was canceled. FIG. 6 similarly shows the percentage complete 157 when the search is in progress. Any search results 158 that were found prior to the cancel request will remain for the user to examine.

Figure 8:
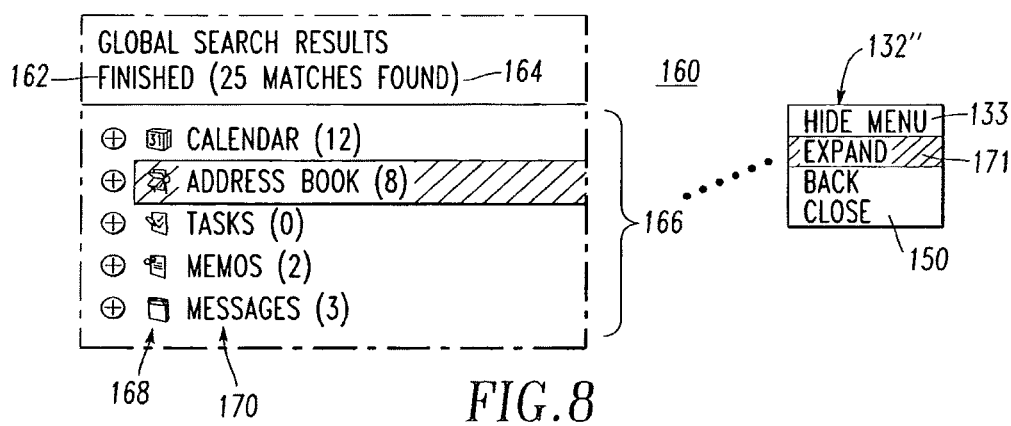
FIG. 8 is an example of a final global search results screen in accordance with another embodiment of the invention.

FIG. 8 shows an example of a final global search results screen 160. After the search is completed, the status line will indicate this ("Finished" 162) and the total count of matches 164 that were found. In this example, the counts of matches from the Calendar application 90, the Address Book application 92, the Tasks application 94, the MemoPad (Memos) application 96 and the Messages application 98 are 12, 8, 0, 2 and 3, respectively, for a total count of matches 164 of 25 across all of the example applications being searched.

Below the status line are the search results 166 grouped by component. Each group identifies the component using both an icon 168 and text 170, and indicates the count of matches in the group. Each group can be expanded or collapsed using the menu item "Expand" 171 (FIG. 8) or the keyboard key <SPACE> 137 (FIG. 1). The menu 132" may be displayed in a similar manner for the screen 160 of FIG. 8 as is the menu 132 of FIG. 5 for the screen 116 of FIG. 4. In this example, selection of a single item from the search results 166 is supported, although the invention is applicable to a wide range of selections including one, some or all of the items of the search results 166. It will be appreciated that corresponding groups can be expanded, collapsed and selected in the search results 142 (FIG. 6) and 158 (FIG. 7) in a similar manner.

As shown in FIGS. 6-8, the search results 142, 158, 166 are presented by application type and can be expanded (as is discussed below in connection with FIGS. 9A-9E) and directly manipulated (as is discussed below in connection with Examples 4 and 5, Table 1 and FIG. 10D) directly from the Global Search application 100.

Example 4

Search results are preferably displayed in a manner consistent with the search result item's native application, such as, for example, one of applications 90, 92, 94, 96 and 98 (FIG. 3). Thus, the user is able to interact with the search result items in much the same manner that they would in the item's native application. For example, messages from the Messages application 98 would be displayed as they would appear in a message list (not shown) of the device 4, while calendar appointments of the Calendar application 90 would be displayed in a view similar to that application's agenda view (not shown).

The exact menu items and keyboard interactions that are available depends on the search result item that is currently selected. Typically, as a minimum, menu items are available for viewing and/or editing and deleting the selected item.

Example 5

For example, items from the search results 142, 158, 166 can be directly viewed, directly edited or directly deleted as appropriate from those search results without otherwise having to open the item from its native application. Messages from the Messages application 98 can be directly forwarded or a reply thereto can be directly sent from the search results. Address Book contacts of the Address Book application 92 with e-mail addresses or phone numbers can, for example, be directly e-mailed or directly called, respectively, again, from the search results without having to open the item from its native application.

Within each group of FIGS. 6-8, the items matching the search criteria are displayed in a manner consistent with the items' native application in the manner shown, for example, in Table 1 and FIGS. 9A-9E.

TABLE 1

| Application | Manner of Display |
|---|---|
| Calendar 90 | Appointments are displayed in a view similar to Calendar's agenda view |
| Address Book 92 | Contacts are displayed as a simple list, which is sorted based on the Address Book Sort By setting |
| Tasks 94 | Tasks are displayed as a list including task name, completion status and priority, which list is sorted by the Task's Sort By setting |
| Memos 96 | Memos are displayed as a simple list, which is sorted alphabetically by Memo title |
| Messages 98 | Messages are displayed (as in the message list) with, for example, all date separators and fields |

Figure 9A:
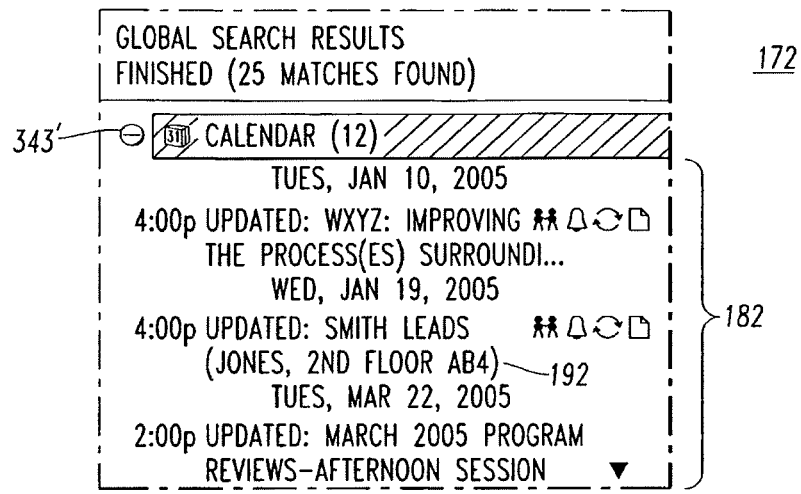
FIGS. 9A-9E are examples of global search results screens in accordance with other embodiments of the invention.

FIGS. 9A-9E show examples of global search results screens 172, 174, 176, 178 and 180. FIG. 9A shows search results 182 from the Calendar application 90. FIGS. 9B through 9E respectively show search results 184, 186, 188 and 190 from the Address Book, Tasks, Memos and Messages applications 92, 94, 96 and 98. The Calendar search results 182 include various appointments such as 192.

Example 6

In FIG. 9A, with the Calendar search results 182, if a recurring appointment matches the search criteria, then only the recurrence series appointment and any modified instances of the appointment, if they match, are displayed. For simplicity of display, recurrence instances are not fanned out as they are in the agenda view (not shown) of the Calendar application 90. Alternatively, it will be appreciated that recurrence instances may be fanned out in the Calendar search results 182.

Figure 9B:
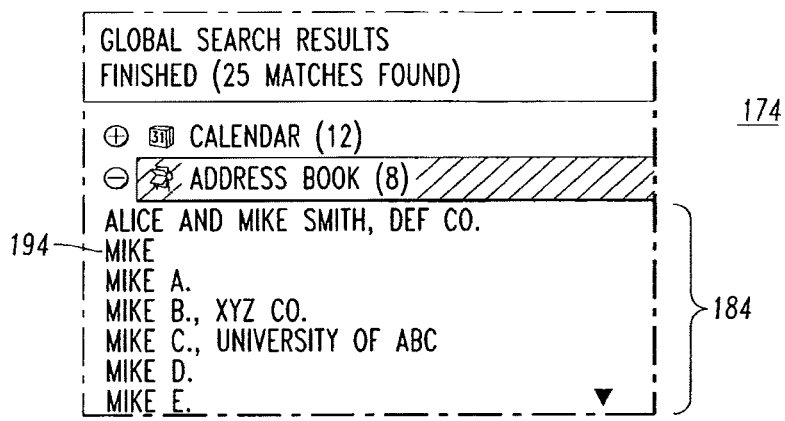
Figure 9C:
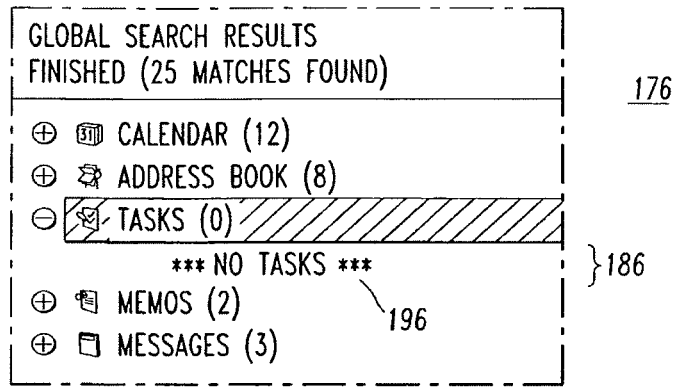

As shown in FIG. 9B, contacts, such as 194 of the Address Book search results 184, are displayed as a simple list, which is sorted based on the "Sort By" setting (e.g., first name; last name; company name) of the Address Book application 92.

The Tasks search results 186 show "No Tasks" 196, which indicates that there were no matches for the corresponding search criteria 118 (FIG. 4). If, however, there were one or more particular Tasks search results, then those are displayed, for example, as a list (not shown) including task name, completion status and priority, which list is sorted by the task's "Sort By" setting (e.g., subject; priority; due date; status) of the Tasks application 94.

Figure 9D:
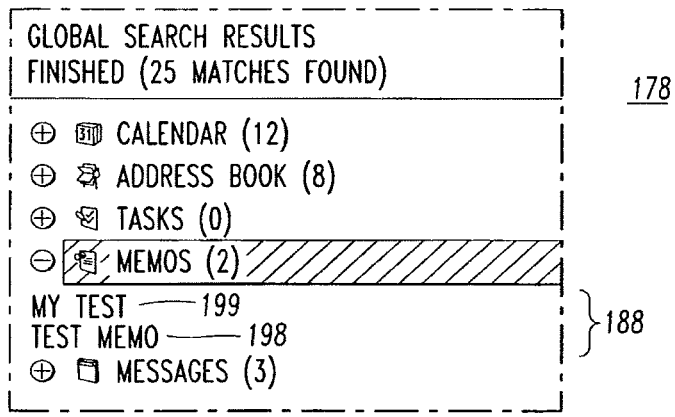

As shown in FIG. 9D, the memos, such as 198, 199 of the Memos search results 188 are displayed as a simple list, which is sorted alphabetically by memo title.

Figure 9E:
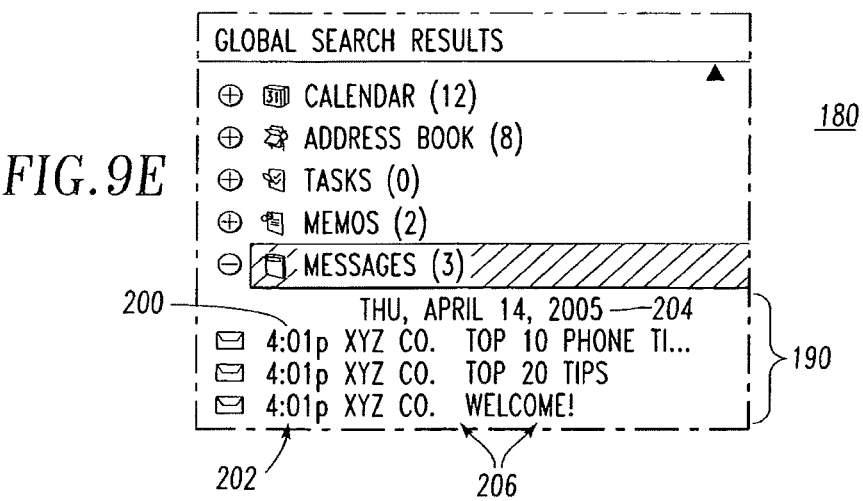

The Messages, such as 200, of the Messages search results 190 of FIG. 9E are displayed, as in the message list (not shown) of the Messages application 98, with, for example, all date separators 202, 204 and fields 206.

Each item that is to be searchable in the device 4 makes one, some or all of its fields available for searching based on specific predetermined criteria. Table 2 identifies the fields that are searchable for each searchable item and the type of criteria that they would match against. The selectable criteria types and/or the selectable components (FIG. 4) to be searched optimizes the search speed for the desired search.

TABLE 2

| Searchable Item | Field | Criteria Type |
| --- | --- | --- |
| Message - E-mail, PIN | Address Fields | Name |
| | Subject | Text |
| | Body | Text |
| Message - SMS | Address Fields | Name |
| | Body | Text |
| Message - MMS | Address Fields | Name |
| | Subject | Text |
| | Body | Text |
| Message - Phone Call | Address Fields | Name |
| | Subject | Text |
| | Notes | Text |
| Message - Voice Mail | Address Fields | Name |
| | Body | Text |
| Address Book Contact | First Name | Name |
| | Last Name | Name |
| | Company | Text |
| | Job Title | Text |
| | User 1 | Text |
| | User 2 | Text |
| | User 3 | Text |
| | User 4 | Text |
| | Notes | Text |
| Calendar Appointment | Subject | Text |
| | Location | Text |
| | Attendees | Name |
| | Notes | Text |
| Task | Task | Text |
| | Notes | Text |

TABLE 2-continued

| Searchable Item | Field | Criteria Type |
| --- | --- | --- |
| Memo | Title | Text |
| | Body | Text |
| Group Addresses | Name | Text |

FIGS. 10A1-10A2 and 10B-10D form a flowchart of the software of the Global Search application 100 (FIG. 3) as executed by the processor 16 of FIG. 2. After starting, at 210, the global search specification screen 116 of FIG. 4 is displayed at 212. If the <ESC> key 45 (FIG. 1) is detected at 214, then the software exits at 216 back to the application for the home screen output 64 of FIG. 1. Otherwise, if other text is input at 218, then that text is entered at the current cursor position (e.g., 84 of FIG. 4) at 220. If other text is not input, or after 220, it is determined if one of the screens 140, 148, 160 of FIGS. 6-8 is currently being displayed, and, if so, then at 224, the routine Update Global Search Results (FIG. 10D) is executed. If a search results screen is not displayed, or after 224, it is determined if the menu 132 of FIG. 5 is displayed. If not, then execution resumes at 232. Otherwise, if no menu is displayed, it is determined, at 228, if the thumbwheel 32 (FIG. 1) was actuated in the direction 38 to request the menu 132. If not, then execution resumes at 214. Otherwise, the menu 132 is displayed, at 230.

Also referring to FIG. 5, next, at 232, if the menu item "Hide Menu" 133 is selected, then the menu 132 is removed from the display 60 (FIG. 1) and step 214 is repeated. Otherwise, at 236, if the menu item "Change Option" 237 (FIG. 4) is selected, or if a menu item "Select All" (not shown) is selected, and if the cursor 84 is on one of the check boxes 134, at 238, then a check is set at the cursor position (or at all of the check boxes 134 if "Select All" is selected) and step 214 is repeated. On the other hand, if the cursor 84 is not on one of the check boxes 134, then the menu item "Change Option" 237 (FIG. 4) is not displayed and step 214 is repeated. Otherwise, at 242, if the menu item "Clear Field" 243 is selected, and if the cursor 84 is on one of the entry fields 126, 128, at 244, then the entry at the cursor position is cleared, at 248, and step 214 is repeated.

Figure 10B:
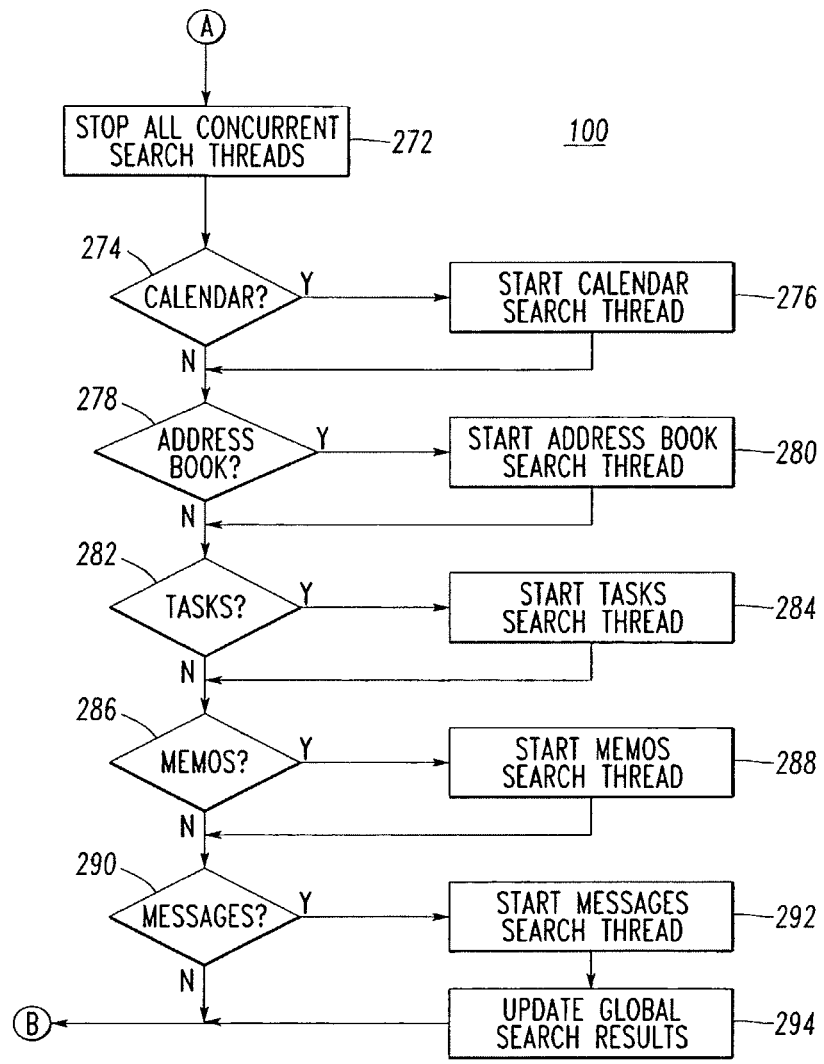

If the test failed at 242, then, at 250, if the menu item "Search" 138 is selected, then execution resumes at 272 of FIG. 10B. Otherwise, at 252, if the menu item "Deselect All" 253 is selected, then all of the entries of FIG. 5, regardless of the cursor position, are cleared at 254, and step 214 is repeated. If the test failed at 252, then, at 256, if the menu item "Select Name" 130 is selected, then a list of names from the Address Book application 92 (FIG. 3) is displayed at 258. Then, at 260, one of the names is selected by the user for entry into the Name field 128 of FIG. 4, after which execution resumes at 214. If the test failed at 256, then, at 262, if the menu item "Show Symbols" 263 is selected, then, at 264, a list of symbols 265 from the memory 20 (FIG. 3) is displayed. Next, at 266, one of the symbols is selected by the user for entry into the Name field 128 or the Text field 126 of FIG. 4, after which execution resumes at 214. If the test failed at 262, then, at 268, if the menu item "Close" 150 is selected, then, at 270, the software exits back to the application for the home screen output 64 of FIG. 1. Otherwise, execution resumes at 232.

Next, at 272 of FIG. 10B, any and all concurrent search threads for the different components 120 of the immediately preceding search are stopped before new search threads are launched. At 274, if the check box 134A for the Calendar component 120 is selected, then, at 276, the Calendar search thread is launched. On the other hand, if the check box 134A was not selected, or after 276, then execution resumes at 278, in order to test the check box 134B for the Address Book component 120 and, if selected, launch the corresponding Address Book thread. In this manner, steps 278-280, 282-284, 286-288, 290-292 are employed to test the check boxes 134B, 134C, 134D, 134E and, if selected, launch the corresponding Address Book, Tasks, Memos and Messages threads, respectively. In this manner, the search is initiated based upon one, some or all of Messages, Address Book, Calendar, Tasks and Memos components. After 292, at 294, the routine Update Global Search Results (FIG. 10D) is executed. If the test failed at 290, or after 294, execution resumes at 214 of FIG. 10A1.

Figure 10C:
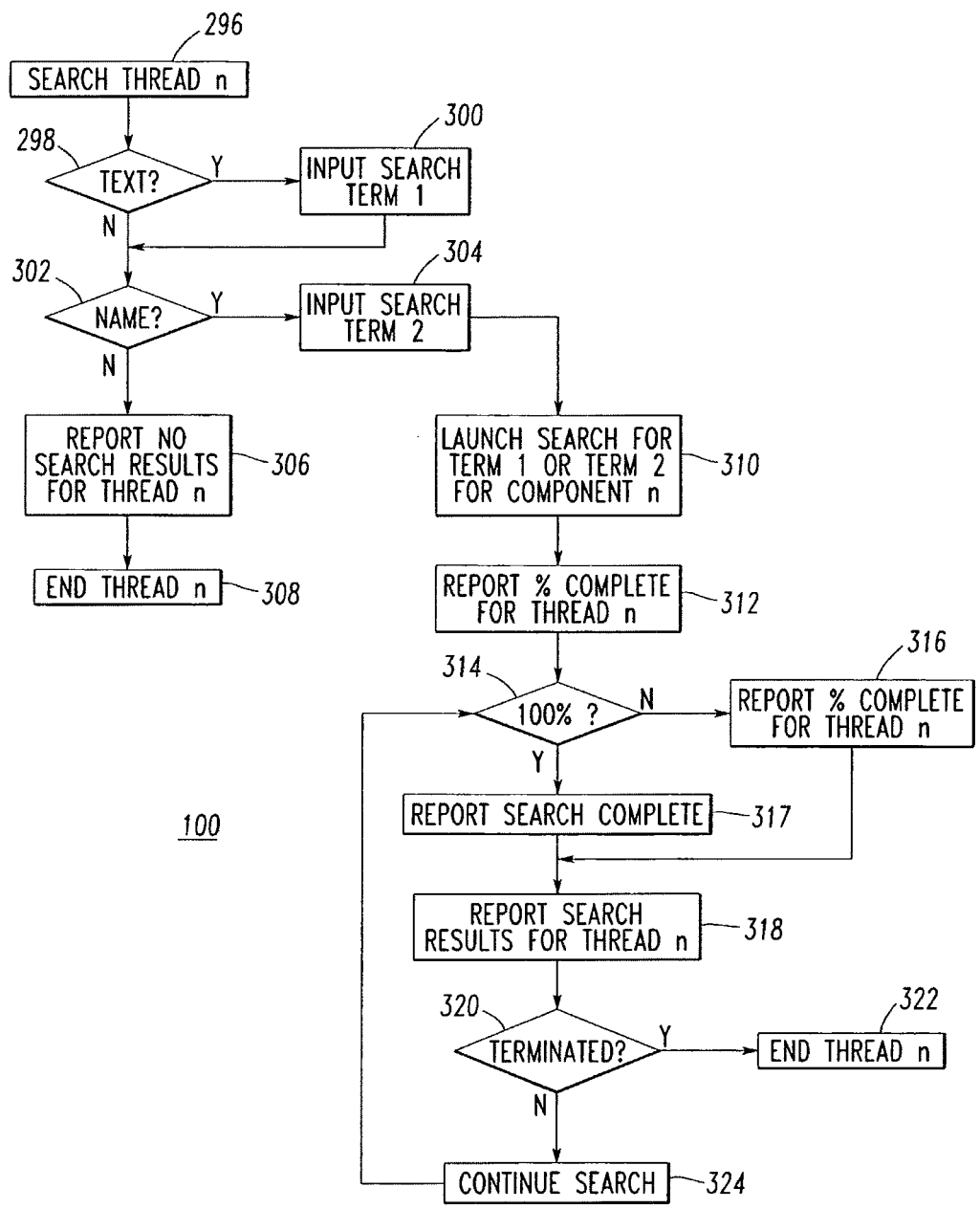

FIG. 10C shows the software executed by one of the threads (THREAD n) of FIG. 10B, it being understood that any of the five example threads employs essentially the same logic. After stating at 296, at 298, it is determined if there is any input in the Text field 126 of FIG. 4. If so, then that input is employed as the first search term at 300. If the test failed at 298, or after 300, at 302, it is determined if there is any input in the Name field 128 of FIG. 4. If so, then that input is employed as the second search term at 304. If the test failed at 302, which means that the user did not elect to search for text and/or a name, since no search criteria are entered, then, at 306, no search results for THREAD n are reported to the routine Update Global Search Results (FIG. 10D) and the THREAD n is self-terminated at 308. Otherwise, after 304, a search of the corresponding component n of the memory 20 (FIG. 3) is launched at 310 for the first search term OR the second search term. For example, the thread for the Calendar application 90 searches the portion of the memory 20 associated with that component.

In this example, as shown in Table 2, the various components of the memory 20 (FIG. 3) include a number of items having a number of text fields and a number of name fields. The search matches the text search criteria from the Text field 126 (FIG. 4) against the text fields of those items, and matches the name search criteria from the Name field 128 (FIG. 4) against the name fields of those items. Here, the search provides matches where the text search criteria OR the name search criteria produces a match.

Next, at 312, the percentage of the corresponding search of THREAD n is reported to the routine Update Global Search Results (FIG. 10D) for updating the field 157 of FIG. 6 or the field 156 of FIG. 7. For example, an average of the percentages from all concurrent threads may be employed. Then, at 314, it is determined if the search by the THREAD n is 100% complete. If not, then, at 316, the percentage of the corresponding search of THREAD n is again reported to the routine Update Global Search Results (FIG. 10D). Otherwise, if the test passed at 314, then the completion of the corresponding search of THREAD n is reported to the routine Update Global Search Results at 317. After 316 or 317, the search results (including the count of matches) of the corresponding search of THREAD n are reported to the routine Update Global Search Results (FIG. 10D) at 318. Next, at 320, it is determined if the THREAD n was terminated by step 272 of FIG. 10B. If so, then the THREAD n is terminated at 322. Otherwise, the search continues at 324 after which step 314 is repeated.

Figure 10D:
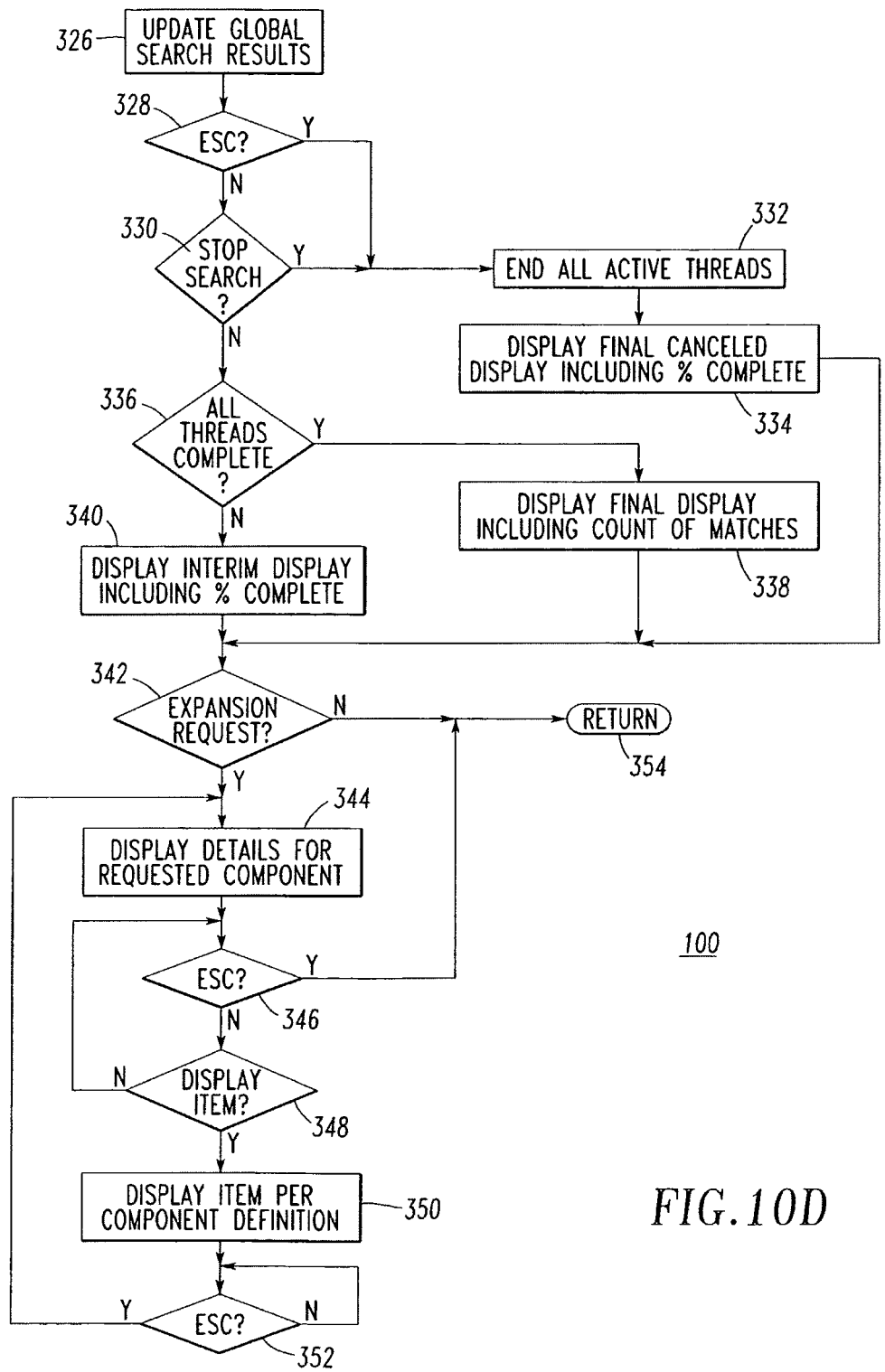

The routine Update Global Search Results starts at 326 of FIG. 10D. First, it is determined if the <ESC> key 45 (FIG. 1) was selected at 328, or if the menu item "Stop Search" 138' of FIG. 6 was selected at 330. If either test is true, then, at 332, any and all concurrent search threads for the different components 120 of the current search are stopped. Next, at 334, the canceled global search results screen 148 (FIG. 7) is updated and displayed. In this manner, the user is able to cancel an in progress search without losing the current search results as shown in FIGS. 6 and 7. After 334, execution then resumes at 342.

On the other hand, if the <ESC> key 45 (FIG. 1) and the menu item "Stop Search" 138' of FIG. 6 are both not active, then, at 336, it is determined if all concurrent threads are completed based upon the reports of step 317 of FIG. 10C. If so, then the final global search results screen 160 (FIG. 8) is updated and displayed. Otherwise, the interim global search results screen 140 (FIG. 6) is updated and displayed. After 338 or 340, at 342, it is determined if there is an expansion-related request based, for example, on the selection of the symbol 343 ("+") of FIG. 6 or the symbol 343' ("−") of FIG. 9A. If, for example, the symbol 343 ("+") is selected, then the screen 172 of FIG. 9A is displayed at 344, in order to expand and display the individual items (e.g., appointments 192) of the Calendar component. Next, at 346, it is determined if the <ESC> key 45 (FIG. 1) is active. If so, then the routine Update Global Search Results returns at 354. Otherwise, at 348, it is determined if a particular one of the displayed items is selected. If so, then at 350, the selected one of the displayed items is displayed per the component definition of Table 1. Otherwise, if one of the displayed items is not selected, then step 346 is repeated. After 350, at 352, it is determined if the <ESC> key 45 (FIG. 1) is active. If so, then step 344 is repeated. Otherwise, step 352 is repeated.

Example 7

If both of the example two search criteria 118 of FIG. 4 are specified, then any item matching either search criteria will be returned (i.e., the search criteria are combined using OR versus AND logic).

Example 8

Figure 11:
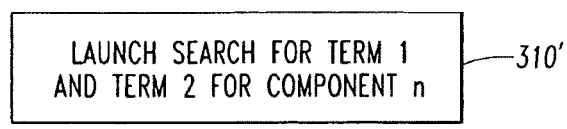
FIG. 11 is an example of another search alternative for the flowchart of software of FIG. 10C in accordance with another embodiment of the invention.

Alternatively, if both of the example two search criteria 118 of FIG. 4 are specified, then any item matching both search criteria will be returned (i.e., the search criteria are combined using AND versus OR logic). This is shown in FIG. 11 where for FIG. 10C, a search of the corresponding component n of the memory 20 (FIG. 3) is launched at 310' for the first search term AND the second search term.

Example 9

The search results screens 140 (FIG. 6) and 160 (FIG. 8) are dynamic. That is, as items are added, updated or deleted, the search results are updated accordingly. For example, if a memo, such as 198 (FIG. 9D) is added to the device 4 that matches one of the search criteria 118 (FIG. 4), then it will be added to the search results 188 without having to redo the search. This is because the search continues at step 324 (FIG. 10C) even after it is completed as determined at 314. Similarly, deleting a memo, such as 199 (FIG. 9D), will remove it from the search results 188 as will updating a memo so that it no longer matches the search criteria 118.

Example 10

The text of the search criteria 118 (FIG. 4) matches a text field of an item of one of the components 120 if the text field of that item of that component has a word containing the text in the text field 126 of the search criteria 118. For example, if the word in the text field 126 was "ill", then it would match words such as fill, pill, miller and so on.

Example 11

The text in the text field 126 (FIG. 4) that the user enters may contain mixed case characters, symbols, multiple words and a wide range of other characters or symbols. The search may be case insensitive, although it will otherwise attempt to match the exact text as entered by the user.

Example 12

If multiple words are entered for the text in the text field 126 (FIG. 4) of the search criteria 118, then the search criteria will match only if a text field of an item of a component matches all of the words in the search criteria.

Example 13

As an alternative to Example 12, if multiple words are entered for the text in the text field 126 (FIG. 4) of the search criteria 118, then the search criteria will match only if a text field of an item of a component matches any of the words in the search criteria.

Example 14

The name of the search criteria 118 (FIG. 4) matches in a manner similar to text search criteria except only on name fields of, for example, Table 2. For example, e-mail address headers in an e-mail message will match against name search criteria, but not against general text search criteria.

Example 15

If the user enters both a text and a name search criteria, then items that match either of the two search criteria will be returned in the search results.

Example 16

As an alternative to Example 15, if the user enters both a text and a name search criteria, then items that match only both of the two search criteria will be returned in the search results.

Example 17

Each component is searched on a separate thread as was discussed above in connection with FIGS. 10B-10D. This means a potential for up to five different threads (e.g., five instances of THREAD n for the five different components 120) running for a global search including the example components 120 of FIG. 4.

Example 18

As an alternative to Example 17, in the event that, for example, five threads might impose too much load on the device 4, then possible options include having a thread manager (not shown) handle distributing threads for the different search tasks.

Example 19

As another alternative to Example 17, the thread manager (not shown) may terminate threads entirely after the search completes. This, however, removes the dynamic update ability of the search results 160 of FIGS. 8 and 10C.

Example 20

Although a simple, basic Global Search application 100 is disclosed, it will be appreciated that increased levels of search sophistication may be employed. For example, additional search options (e.g., match case; whole word only; all words versus any words; other suitable search options) may be provided.

Example 21

Figure 12:
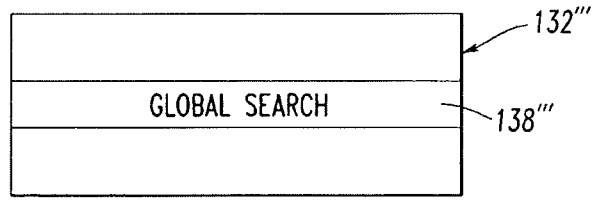
FIG. 12 is an example of a menu including a menu item to launch the Global Search application of FIG. 3.

Although FIG. 4 shows the Global Search application 100 (FIG. 3) being initiated from the icon 112 of the home screen output 64 (FIG. 1), it may advantageously be initiated from any suitable application, such as, for example, any or all of applications 90, 92, 94, 96, 98 of FIG. 3. For example, if the Global Search application 100 is initiated from within the Calendar application 90, then a menu item 138''' of a Calendar menu 132''' as shown in FIG. 12 may launch the application 100.

Example 22

One or more additional search criteria may be provided to, for example, support searching different message types (e.g., e-mail versus SMS) and/or searching by date since, for example, Calendar appointments (as shown in FIG. 9A) and Messages (as shown in FIG. 9E) have a date component therein and/or searching by message attachments.

Example 23

Figure 13:
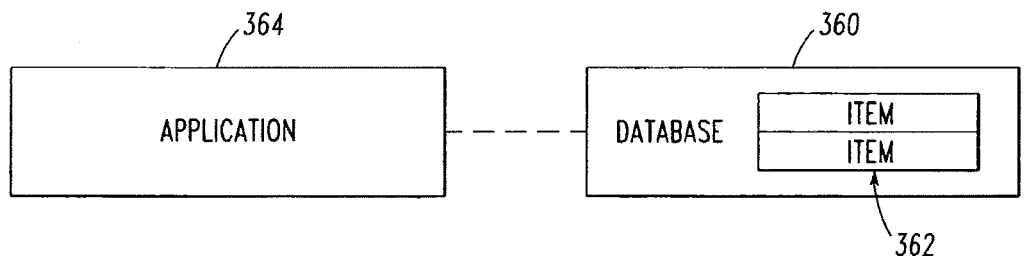
FIG. 13 is a block diagram of an application and a corresponding application database including a plurality of items to be searched for the memory of FIG. 3 in accordance with another embodiment of the invention.

As shown in FIG. 13, one, some or all of the components 120 (FIG. 4) to be searched may include an application database 360 including a plurality of items 362 in the memory 20 (FIG. 3) associated with a corresponding application 364.

Example 24

Although example search criteria are disclosed, a wide range of other search criteria may be employed. As a non-limiting example, a category may be employed as another search criteria where "category" refers to a PIM categorization in which the user groups PIM items by different categories. Adding a category as another search criteria, or as a different search criteria, allows further granularity in searching by adding this as an attribute of one or more various PIM items (e.g., as shown, without categories, in Table 2).

While for clarity of disclosure reference has been made herein to the example display 60 for displaying PIM information and applications, it will be appreciated that such information may be stored, printed on hard copy, be computer modified, or be combined with other data. All such processing shall be deemed to fall within the terms "display" or "displaying" as employed herein.

The disclosed user interface for the Global Search application 100 is seamless and permits relatively simple navigation through the various user selections and display screens that report the progress of the search and the search results.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of searching on a handheld electronic device, comprising:
receiving input of at least one search criteria;
receiving input to select at least two of a plurality of components of the handheld electronic device to be searched;
conducting a search of the at least two components based upon the at least one search criteria;
determining at least one search result from the search;
displaying the at least one search result; and
displaying and providing, for the at least one search result, at least one user interaction available from a different application, and performing one of the at least one user interaction directly from the search results displayed, without opening the different application, the at least one user interaction being selected from a group including directly editing the item, directly forwarding a message, replying to a message, directly e-mailing an e-mail address and directly calling a phone number.

2. The method of claim 1 wherein the at least one search criteria comprises a text search criteria or a name search criteria.

3. The method of claim 1 wherein the different application is selected from a group including a messages application, a calendar application, an address book application, a memos application and a tasks application.

4. The method of claim 1 further comprising:
after initiating the conducting a search of the at least two components and before concluding the search, displaying at least one of the at least one search result.

5. The method of claim 4 further comprising:
after the displaying at least one of the at least one search result, continuing to conduct the search and displaying another one of the search results.

6. The method of claim 4 further comprising:
cancelling the search; and
continuing the displaying of the at least one of the at least one search result.

7. The method of claim 4 further comprising:
after the concluding the search, displaying all of the search results.

8. The method of claim 1 further comprising:
displaying as the representation of the plurality of components a plurality of check boxes corresponding to the different applications;
accepting input from at least two of the check boxes; and
conducting the search based upon the at least one search criteria and the input from at least two of the check boxes.

9. The method of claim 1 further comprising:
employing as a representation of the plurality of components a representation of at least a first different application and a second different application;
displaying a first group of the search results associated with the first different application; and
separately displaying a second group of the search results associated with the second different application.

10. The method of claim 1 further comprising:
displaying a screen including a plurality of search entry fields and a plurality of representations of different applications to be searched;
accepting input of at least one of the search entry fields and at least two of the representations of the different applications to be searched;
displaying a menu associated with the screen; and
accepting input to start the search from the menu.

11. The method of claim 1 further comprising:
receiving input of a plurality of search criteria as the at least one search criteria;
accepting input from a menu item to start the search based upon the plurality of search criteria and the at least two components; and
displaying a search results screen including as the at least one search result a plurality of search results.

12. The method of claim 1 further comprising:
displaying with the at least one search result a status of the search; and
including as the status one of an in progress status, a cancelled status and a completed status.

13. The method of claim 1 further comprising:
displaying with the at least one search result a completed status of the search and a total count of matches therefor.

14. The method of claim 1 further comprising:
for each different application, displaying a count of matches for the different application.

15. A handheld electronic device comprising:
a processor circuit including a plurality of routines and a memory having a plurality of components;
an input circuit cooperating with the processor circuit; and
a display circuit cooperating with the processor circuit,
wherein at least one of the routines is adapted to input from the input circuit at least one search criteria and at least two of the plurality of components, to conduct a search of the memory based upon the at least one search criteria and the selected at least two of the plurality of components to be searched, to determine at least one search result from the search, and to display and provide, for the at least one search result, at least one user interaction available from a different application, and perform one of the at least one user interaction directly from the search results displayed, without opening the different application, the at least one user interaction being selected from a group including directly editing the item, directly forwarding a message, replying to a message, directly e-mailing an e-mail address and directly calling a phone number.

16. The handheld electronic device of claim 15 wherein the at least one search criteria includes a text search criteria and a name search criteria; wherein the at least one of the routines is further adapted to conduct the search of the memory based upon the text search criteria and the name search criteria, and to
match the at least one search result to both of the text search criteria and the name search criteria.

17. The handheld electronic device of claim 15 wherein the plurality of components to be searched include a plurality of application databases in the memory including at least some of a messages application database, a calendar application database, an address book application database, a memos application database and a tasks application database.

18. The handheld electronic device of claim 15 wherein the at least one of the routines is adapted to:
employ as a representation of the plurality of components a representation of at least a first different application and a second different application;
display a first group of the search results associated with the first different application; and separately display a second group of the search results associated with the second different application.

19. The handheld electronic device of claim 15 wherein the at least one of the routines is adapted to:

display a screen including a plurality of search entry fields and a plurality of representations of different applications to be searched;

accept input of at least one of the search entry fields and at least two of the representations of the different applications to be searched;

display a menu associated with the screen; and accept input to start the search from the menu.

20. A non-transitory computer-readable medium having computer-readable instructions stored thereon that when executed cause a processor to implement a method of searching on a handheld electronic device, the method comprising:

receiving input of at least one search criteria;

receiving input to select at least two of a plurality of components of the handheld electronic device to be searched;

conducting a search of at least the components based upon the at least one search criteria;

determining at least one search result from the search;

displaying the at least one search result; and displaying and providing, for the at least one search result, at least one user interaction available from a different application, and performing one of the at least one user interaction directly from the search results displayed, without opening the different application, the at least one user interaction being selected from a group including directly editing the item, directly forwarding a message, replying to a message, directly e-mailing an e-mail address and directly calling a phone number.

\* \* \* \* \*